Jan. 19, 1937.    O. C. TATE, SR    2,068,041
TRUCK COVER
Filed Feb. 15, 1935
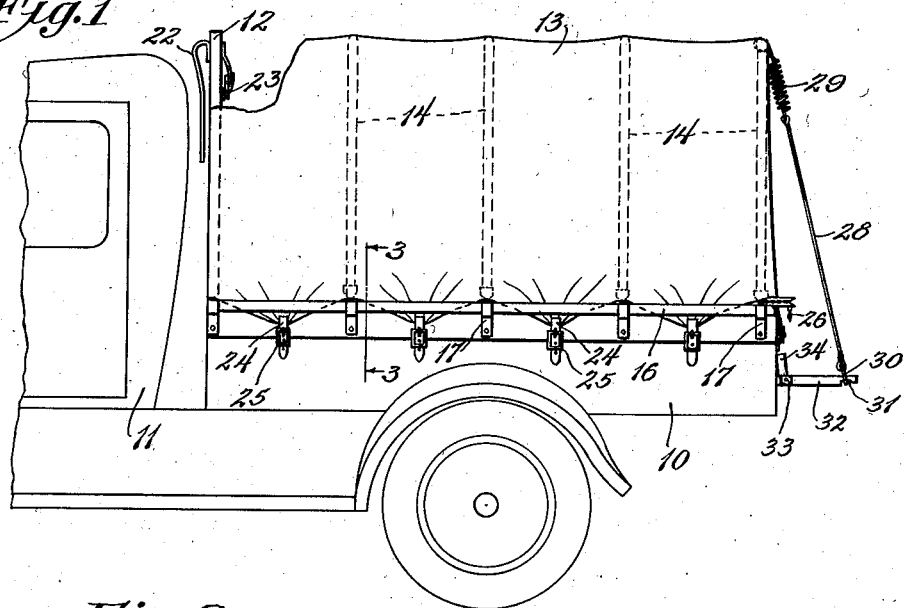
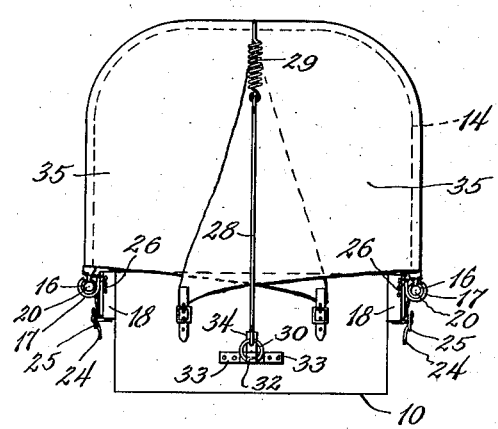
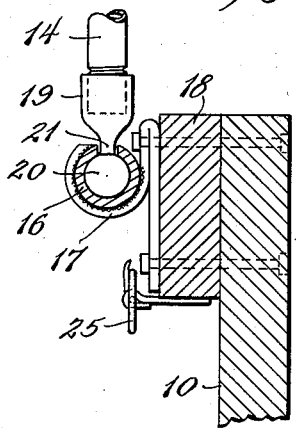
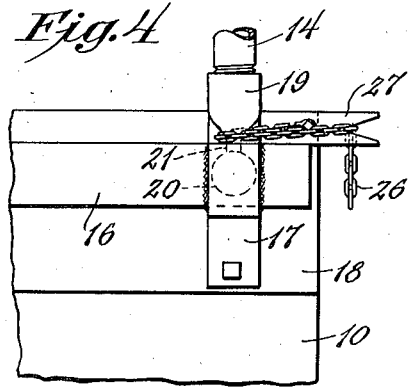
Inventor
O. C. Tate, Sr.
By A. D. Adams
Attorney Patented Jan. 19, 1937

2,068,041

UNITED STATES PATENT OFFICE 2,068,041

TRUCK COVER

Otto C. Tate, Sr., Bishop, Ga., assignor of one-half to Ida Loyd Branch, Bishop, Ga.

Application February 15, 1935, Serial No. 6,760

2 Claims. (Cl. 296—105)

This invention relates to body covers or tarpaulins and, among other objects, aims to provide an improved collapsible frame and cover or tarpaulin for truck or vehicle bodies having novel means whereby it may be easily manipulated by a single operator.

Other aims and advantages of the invention will appear in the specification, when considered in connection with the accompanying drawing, wherein:

Fig. 1 is a side elevation of a motor truck body having one form of cover embodying the invention;

Fig. 2 is a rear end elevation of the body;

Fig. 3 is an enlarged sectional view taken on the line 3—3 of Fig. 1, the canvas cover being omitted;

Fig. 4 is a fragmentary side elevation on an enlarged scale showing the rear bow of the cover frame fastened in its open position; and Fig. 5 is a sectional view through one of the bows showing how the canvas cover is attached to the intermediate bows.

Referring particularly to the drawing, the improved collapsible cover or tarpaulin there shown is applied to the body 10 of an ordinary motor vehicle having a driver's cab 11; although it is to be understood that the improved cover may be applied to other types of vehicle bodies. In this example, the front end wall extends vertically above the side walls to provide a closed permanent front end 12 for the cover. This end wall is preferably in the form of wooden boards. However, it may be made of canvas secured to a permanent bow member. The main cover 13 is conveniently composed of cotton waterproofed fabric or other suitable weatherproof material, and is mounted on a pipe frame consisting of a plurality of bows 14 threaded through pockets formed by stitched strips 15 on the inside of the cover.

The frame members or bows are so mounted that they may be slid back and forth lengthwise of the truck body 10. In this instance, the ends of the bows are mounted to slide back and forth in slotted runways in the form of tubular members 16 rigidly supported on the side walls of the body by means of strap metal brackets 17 which are bolted or otherwise secured to wood strips 18 on the outer side walls of the body. In this example, the tubular runways are shown as being welded in the brackets 17 and the ends of the bows are shown as having special metal fittings 19 in the form of screw-threaded metal caps on the ends of the pipe bows each having a ball extension 20 adapted to fit slidably within the runways and having a narrow neck 21 guided into longitudinal grooves in the runways. The construction and arrangement is such that the cover may be assembled on the truck body after the tubular runways are installed by threading or inserting the ball ends 20 of the bows successively into the open rear ends of the runways. Then the front end of the cover is permanently secured to the permanent front end wall 12 of the body. The whole thing may be collapsed by pushing the bows forwardly to crumple or fold the canvas between successive bows and they may be held in collapsed position during fair weather by means of a strap 22 and buckle 23 or other suitable fastening means on the front end wall.

In Fig. 1, the cover is shown as being extended and secured to the body in its proper position. In this instance, the portions between the bows have strap extensions 24 adapted to be secured by buckles 25 to the body, the buckles being shown as being suitably connected to the lower edges of the strips 18. The rear bow is shown as being held in its proper position with the cover stretched as far as it will go by means of fastening chains 26 each having one end permanently secured with respect to the body and passed around the lower end of the bow, the free end being suitably fastened as by means of a bifurcated or slotted metal fastening element 27. However, it is to be understood that other suitable adjustable fastening means may be employed. The upper portion of the rear bow frame is likewise supported or held stretched conveniently by resilient means, such as a cable or strap 28 having a spring 29 connected directly to the top of the body. This cable or strap is shown as having a ring or loop member 30 in its free end adapted to be hooked on or connected to the outer notched end 31 of a pivoted bracket 32 projecting rearwardly from the tailgate or rear end wall of the truck body. In this example, the bracket 32 is pivoted between lugs or ears 33 on the rear end wall or tailgate of the body and has a stop arm or foot 34 adapted to contact the rear wall when the bracket 32 is in its horizontal position as shown in Fig. 1. The arrangement is such that when the cable or strap 28 is disconnected from the bracket 32, it will swing downwardly out of the way.

While the rear end of the cover may be closed in various ways by suitable flaps and the like, it is here shown for convenience as having a pair of similar flap sections 35 each adapted to be buckled in overlapped relation to the rear end wall of the truck body or tailgate.

From the foregoing description, it will be seen that the improved cover frame is exceedingly simple in its construction and can be manufactured of standardized parts, such as ordinary galvanized pipe, strap metal and the special fittings. The bows will be made of different widths or sizes to suit the bodies of different trucks and even the canvas cover may be standardized for trucks of the same type. The whole cover may be very quickly applied to any ordinary body at relatively small cost. Moreover, the cover can be manipulated by a single operator. The ball lugs in the runways will not bind when the bows are moved longitudinally of the runways. Furthermore, the construction is such as to permit contraction or expansion of the cover without any damage.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. A collapsible cover for truck bodies and the like comprising, in combination, a pair of pipe runways on opposite sides of the body each having a longitudinal slot; securing strips on the sides of the body; a plurality of strap metal brackets for the runways intermediate their ends each having a straight vertical portion to be secured to said side strips and a bent portion below the upper end partially surrounding and welded to said pipes; a flexible cover fixed at its front end relative to the body; a plurality of bows for the cover each having fittings slidably mounted in said runways; means to hold the cover stretched over the body; and means to tie the collapsed cover at the front of the body.

2. In combination with a truck body of the class described, a collapsible cover carrying a series of tubular bows; slotted pipe runways providing guides for the bows; spaced bent metal brackets, one for each bow, welded to each of the runways below the slots; securing boards on the outer side walls of the truck body; bolts extending through the brackets, boards and the side walls rigidly connecting them to the body; and means to hold the cover stretched over the body with the ends of the bows approximately alined with and supported by the respective brackets.

OTTO C. TATE, Sr.